United States Patent [19]
Kahle, Sr.

[11] Patent Number: 5,473,213
[45] Date of Patent: Dec. 5, 1995

[54] SEW THROUGH ECITER ARMATURE WITH INTEGRAL BANDING RINGS

[75] Inventor: Frank D. Kahle, Sr., Lima, Ohio

[73] Assignee: Sundstrand Corporation, Rockford, Ill.

[21] Appl. No.: 43,337

[22] Filed: Apr. 6, 1993

[51] Int. Cl.⁶ ..................................................... H02K 3/46
[52] U.S. Cl. ............................ 310/270; 310/45; 310/214; 310/261
[58] Field of Search ...................... 310/270, 271, 310/261, 264, 43, 45, 214, 215, 216, 217, 260, 198

[56] References Cited

U.S. PATENT DOCUMENTS

| | | | |
|---|---|---|---|
| 491,695 | 2/1893 | Wood | 310/261 |
| 729,175 | 5/1903 | Hobart | 310/270 UX |
| 790,475 | 5/1905 | Behrend | 310/261 |
| 882,242 | 3/1908 | Foot | 310/270 UX |
| 1,823,607 | 8/1931 | Jungk | 310/270 UX |
| 3,391,294 | 7/1968 | Moxie | 310/214 |
| 4,358,700 | 11/1982 | Nottingham | 310/270 |
| 4,797,590 | 1/1989 | Raad et al. | |
| 4,896,066 | 1/1990 | Tomite | 310/214 |
| 4,900,959 | 2/1990 | Drinkut et al. | |

FOREIGN PATENT DOCUMENTS

| | | | |
|---|---|---|---|
| 0164722 | 5/1971 | Austria | 310/270 |
| 0438472 | 6/1972 | Switzerland | 310/270 |
| 0792489 | 12/1980 | U.S.S.R. | 310/270 |

OTHER PUBLICATIONS

J. Hindmarsh, "Electrical Machines & Their Applications", pp. 215–217, (no Month) 1977; Paragamon Press, 3rd ed.

Primary Examiner—R. Skudy
Attorney, Agent, or Firm—McAndrews, Held & Malloy

[57] ABSTRACT

An improved armature assembly includes an armature stack mounted coaxially with a rotatable shaft. Conductive windings are disposed in the armature stack in accordance with a preselected winding sequence. The conductive windings include end turns which extend longitudinally beyond the armature stack. End plates are disposed at opposing ends of the armature stack. Each end plate includes an integral banding ring in the form of a retaining flange located radially outwardly of, and in a supporting relation to, the end turns. Each end band further includes a centrally located aperture which is adapted to receive the rotatable shaft and maintain concentricity of between end plate, the armature stack and the rotatable shaft.

22 Claims, 3 Drawing Sheets

1

SEW THROUGH ECITER ARMATURE WITH INTEGRAL BANDING RINGS

BACKGROUND OF THE INVENTION

1. Field of the Invention

This invention relates generally to an exciter for electrical generators and, in particular, to an improved exciter armature design.

2. Background of the Art

Generators are well known for converting mechanical energy to electrical energy. Generators commonly include an exciter mounted at one end of the generator rotor shaft. The exciter produces an output current, such as three-phase A.C. current, which is rectified and supplied to the field windings of the generator. Known exciters typically include a stator fixed to a housing and an armature assembly mounted on or rotatably coupled to the rotor shaft. Conductive windings are disposed in slots in the outer periphery of the armature assembly. The windings are rotated through a D.C. magnetic field established by the stator, thereby producing the A.C. output current in accordance with well-known electromagnetic principles.

The armature assembly forms part of the flux circuit and it also acts as the support structure for the conductive windings. More particularly, during exciter operation, centrifugal forces act to force the windings outward from the generator shaft. If the windings are not properly supported, these forces will distort armature symmetry and induce undesirable vibrations.

To alleviate this problem, the winding slots commonly incorporate support structure in the form of support wedges. Alternatively, semi-closed slots or fully closed slots are sometimes employed to further support the windings. However, these winding slots lend no support to the winding end turns-the portion of a winding which extends beyond the armature stack. In order to support the end turns, it is known to employ end bands constructed of fiberglass or other nonferromagnetic material. Because the end bands are installed after armature winding, it is difficult to ensure concentricity of the end bands and end turns. Additionally, it is difficult to maintain symmetry during exciter operation because the end bands are not secured to the rest of the armature assembly or the rotating shaft. These factors make vibration a continuing problem in conventional exciter designs.

U.S. Pat. No. 4,900,959 to Drinkut et al. attempts to overcome some of the problems set forth above. The Drinkut design is not suitable for many applications because of the excessive size of the retaining cylinder required to provide adequate winding support. Additionally, such a design is difficult to mount in any location other than the end of the rotating shaft.

SUMMARY OF THE INVENTION

The present invention is directed to an improved armature assembly which is rotatably driven relative to a stationary field winding by a rotatable shaft. The armature assembly includes a stack which is mounted coaxially with the rotatable shaft and has a plurality of longitudinal winding slots. Conductive windings are disposed in the winding slots in accordance with a preselected winding sequence. The conductive windings include end turns which extend longitudinally beyond the armature stack. An end turn support is provided for supporting the end turns from outward centrifugal forces during exciter operation. The end turn support is mounted coaxially with the shaft and is fixedly secured against radial displacement.

The end turn support may include first and second end plates disposed at opposing ends of the armature stack. Each end plate includes a retaining flange and a centrally located aperture. The retaining flange is located radially outwardly of, and in a supporting relation to, the end turns. The centrally located aperture is adapted to receive the rotatable shaft and maintain concentricity between end plate, the armature stack and the shaft.

Other objects and advantages of the invention will become apparent upon reading the following detailed description and appended claims, and upon reference to the accompanying drawings.

BRIEF DESCRIPTION OF THE FIGURES

For a more complete understanding of this invention reference should now be had to the embodiment illustrated in greater detail in the accompanying drawings and described below by way of an example of the invention.

In the drawings.

DETAILED DESCRIPTION OF THE PREFERRED EMBODIMENT

Figure 1:
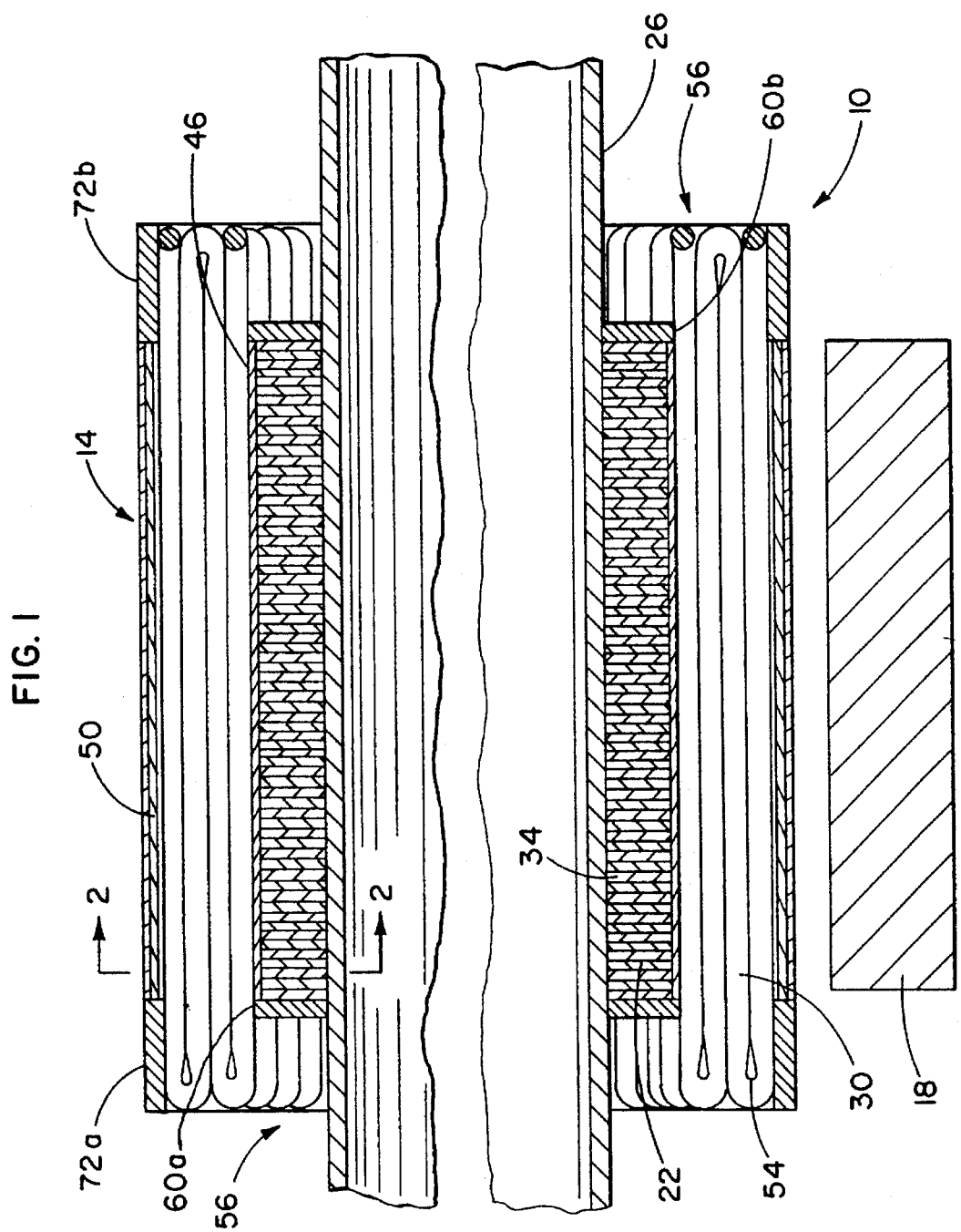
FIG. 1 is a cross-sectional view of an exciter assembly employing the present armature assembly.

FIG. 1 shows a generator exciter 10 including an armature assembly 14 and a stator 18 adapted to produce a D.C. magnetic field. The armature assembly 14 includes an armature stack 22 mounted on or rotatably coupled to the generator rotor shaft 26. Conductive windings 30 are disposed in the armature stack 22. The armature stack 22 rotates the windings 30 through the D.C. magnetic field established by the stator 18, thereby producing an A.C. output current. This may be a three-phase A.C. current which is rectified and supplied to the field windings of the generator (not shown).

The stack 22 includes a plurality of ferromagnetic laminations 34. A single lamination 34 is a thin, flat, generally annular sheet of ferromagnetic material, such as 1050 silicon steel. The laminations 34 are stacked together and shrunk fit to the shaft 26 which passes through a center aperture defined by the laminations 34. The shrink fitting operation tends to prevent slippage between the laminations 34 and the shaft 26. Additional support against slippage is achieved by providing a key (not shown) in the stack laminations 34 and a reciprocal key way (not shown) in the shaft 26. Longitudinal displacement of the individual laminations 34 is constrained by the conductive windings 30. Alternatively, it is conceivable that the stack 22 could be held together by other means, such as rivets running parallel to the shaft 26 or adhesive between the individual laminations 34.

Figure 2:
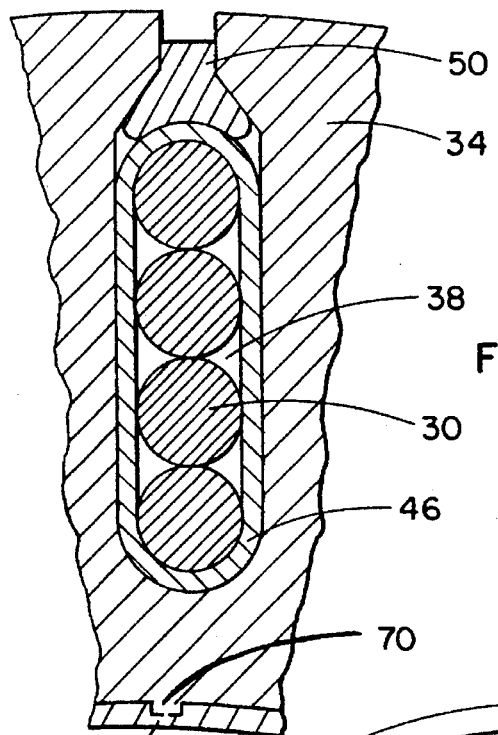
FIG. 2 is a cross-sectional view of a winding slot along line 2—2 of FIG. 1.

Referring additionally to FIG. 2, a cross-sectional view of the winding slot 38 employed in the present armature assembly will be described. As is illustrated, the winding slots 38 are disposed in the outer periphery of the laminations 34. When the laminations 34 are assembled to the rotor shaft 26, the winding slots 38 in the laminations 34 are aligned so as to form longitudinal slots which run parallel to the shaft 26. Although a semi-closed winding slot 38 is illustrated, it is conceivable that open or closed slots could be employed without departing from the scope of the present invention.

A slot insulator 46 made of paper or other suitable insulating material runs through the winding slots 38. A preformed, nonferromagnetic slot spacer 50 is disposed between the slot insulator 46 and the top of the slot 38. The slot spacer 50 is preferably formed of a polyimide sold under the trademark "KAPTON." Another suitable polyimide is sold under the trademark "VESPEL." The semi-closed slot design employed in the present armature assembly 14 advantageously eliminates the need to rely on the slot spacer 50 as a support against the centrifugal forces produced during exciter operation.

The conductive windings 30 are disposed in the winding slots 38 in accordance with a preselected winding sequence so as to produce the desired output current during operation. As is illustrated in FIG. 1, the conductive windings 30 include end turns 54 which extend longitudinally beyond the armature stack 22. An end turn support 56 is provided for supporting the end turns 54 from outward centrifugal forces. The end turn support 56 may include first and second end plates 60a, 60b, mounted coaxially about the rotor shaft at opposing ends of the stack 22.

Figure 4A:
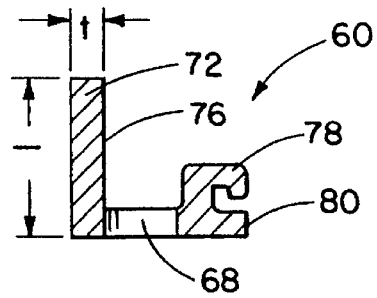
FIG. 4A is a cross sectional view of a coated end plate along line 4—4 of FIG. 3.
Figure 3:
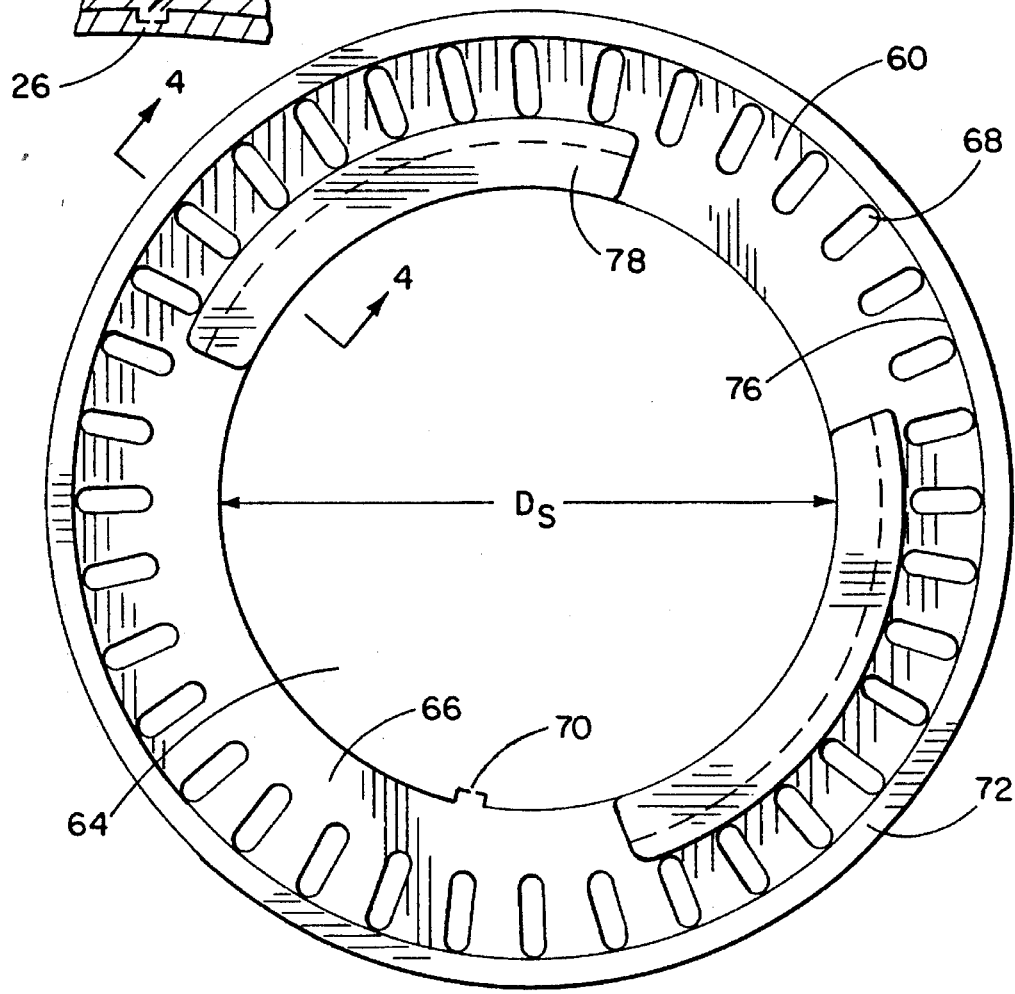
FIG. 3 is a front elevation view of a preferred end plate employed in the present armature assembly.
Figure 4B:
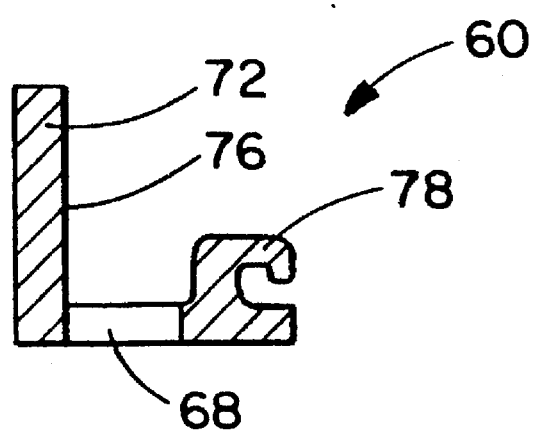
FIG. 4B is a cross-sectional view of a non-ferromagnetic end plate along line 4—4 of FIG. 3.
Figure 4C:
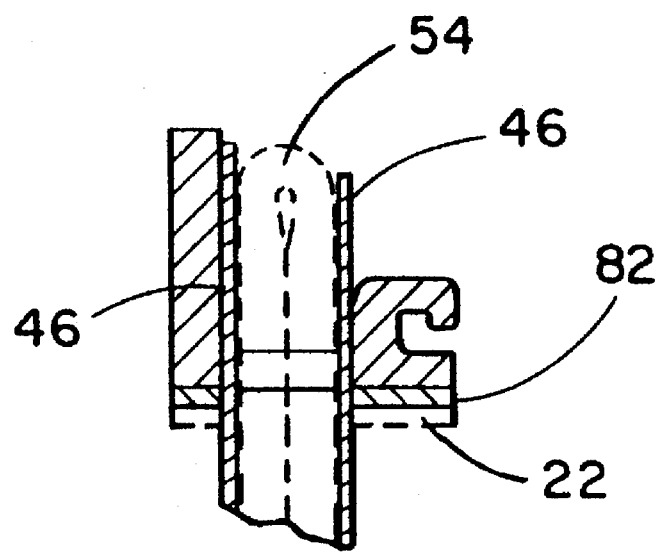
FIG. 4C is a cross-sectional view of an end plate along line 4—4 of FIG. 3 illustrating the use of slot insulation to insulate the end plate.

Referring additionally to FIGS. 3 and 4A–C, the end plates will be described in detail. FIGS. 4A–C are cross-sectional views the end plate 60 along line 4—4 of FIG. 3, each illustrating a different means for insulating the end plate. The end plates 60 have an outer diameter which is substantially the same as the outer diameter of the stack 22. Each end plate 60 includes a disk portion 66 having a centrally located aperture 64 and a plurality of winding apertures 68. The centrally located aperture 64 is substantially the same diameter as the outer diameter $D_S$ of the rotator shaft 26. As such, the aperture 64 serves to maintain concentricity between the end plate 60, the rotator shaft 26 and the stack 22.

The end plates 60 are placed on the shaft 26 at opposing ends of the stack 22. The winding apertures 68 are located so as to align with the winding slots 38 in the stack 22. The conductive windings 30 are then sewn through the composite assembly of the end plates 60a, 60b and the stack 22 in accordance with a preselected winding sequence. In the illustrated embodiment, the windings 30 serve to maintain alignment of, and prevent slip between, the end plates 60 and the stack 22. It is conceivable that the end plates 60 could be fixedly attached to the stack 22 by other means such as adhesive or rivets. Slippage between the end plates 60 and the shaft 26 is prevented because the end plates 60 are secured to the stack 22, and the stack 22 is in turn secured to the shaft 26. Additional support between the end plates 60 and the shaft 26 could be achieved by rigidly connecting the end plates 60 to the shaft 26. For example, this function could readily be accomplished by forming a reciprocal key 70 in the centrally located apertures 64 of the end plates 60 (see FIGS. 2 and 3).

Each end plate 60 includes an integral banding ring in the form of a retaining flange 72 which is located radially outwardly of, and in a supporting relation to, the end turns 54. More specifically, the first end plate 60a includes a retaining flange 72a and the second end plate 60b includes a retaining flange 72b. The retaining flange 72 of the illustrated embodiment has a longitudinal length, 1, (see FIG. 4A) which is substantially the same, or slightly longer than the longitudinal length of the end turns 54. The thickness, t, (see FIG. 4A) of the flange 72 is controlled to some extent by the material selected for forming the end plates 60, as well as the desired degree of mechanical support for the end turns 54. However, the flange 72 is of such thickness as is required to make the inner radial surface 76 of the flange 72 flush with outermost conductive winding 30.

The end plates 60 additionally include integrally formed wire retention grooves 78. These grooves are used to contain the lead wires (not shown) as they are routed to their exit position. A star connection (not shown) is made after the lead wires are positioned in the grooves 78. The star connection is insulated with "KAPTON" or other suitable insulating material, and held in place with a shrinkable teflon.

The end plates 60 may be formed of an epoxy-graphite composite which is approximately 60% to 65% graphite by volume. However, the end plates 60 could readily be constructed from other rigid materials, such as metal. A suitable composite is formed using a resin sold by Shell Chemical as "DPL86/DPS155/EPON Curing Agent W" and graphite fibers sold under the either the trademark "HERCULES AS4" or the trademark "AMOCO T300." Equivalents for these materials can readily be substituted without departing from the scope of the present invention.

The end plates 60 are electrically insulated from the conductive windings 30 and the armature stack 22. This is accomplished by coating the end plates 60 with a layer of insulating material as is illustrated in FIG. 4B such as Doryl® resin. It is also conceivable that the end plates 60 could be formed from a nonferromagnetic material. Alternatively, it is conceivable that the windings 30 could be insulated from the end plate 60 by extending the slot insulation 46 beyond the stack 22 (see FIG. 4C). If such a configuration is employed, it would be necessary to provide a layer of insulating material 82 between the end plates 60 and the armature stack 22.

From the forgoing it will be seen that there has been brought to the art a new and improved armature design which overcomes the problems associated with prior armature designs. While a particular embodiment of the invention has been illustrated, those of ordinary skill in the art will recognize that the illustrated embodiment may be modified and altered without departing from the central spirit and scope of the invention. Thus, the preferred embodiment described herein is to be considered in all respects as illustrative and not restrictive, the scope of the invention being indicated by the appended claims rather than by the foregoing description. Therefore, it is the intention of the inventor to embrace herein all changes which come within the meaning and range of equivalents of the appended claims.

I claim:

1. An armature assembly rotatably driven by a rotatable shaft, comprising:

an armature stack having a plurality of longitudinal winding slots and being mounted coaxially with the rotatable shaft for rotation therewith;

a plurality of conductive windings disposed in the winding slots in accordance with a preselected winding sequence, the conductive windings including end turns which extend longitudinally beyond the armature stack;

first and second end plates disposed at opposing ends of the armature stack, each end plate including no more than one retaining flange and a centrally located aperture, the flange being located radially outwardly of, and in a supporting relation to, the end turns, and the aperture being adapted to receive the rotatable shaft and maintain concentricity between the end plates, the rotatable shaft, and the armature stack.

2. An armature assembly as set forth in claim 1, wherein the end plates are formed of nonferromagnetic material.

3. An armature assembly as set forth in claim 1, including insulating means for electrically insulating the end plates from the armature stack and the conductive windings.

4. An armature assembly as set forth in claim 3, wherein the insulating means comprises a non-conductive insulating coating on the end plates.

5. An armature assembly as set forth in claim 3, wherein the end plates are formed of an epoxy-graphite composite.

6. An armature assembly as set forth in claim 5, wherein the armature stack and the end plates have substantially the same outer diameter.

7. An armature assembly as set forth in claim 3, including a connector means for fixedly securing the end plates to the armature stack.

8. An armature assembly as set forth in claim 7, wherein the connector means comprises the conductive windings.

9. An armature assembly as set forth in claim 3, including a connector adapted to fixedly secure the end plates to the rotatable shaft.

10. An end plate for use in an armature assembly having an armature stack including winding slots and a plurality of conductive windings disposed in winding slots, the conductive windings terminating in end turns which extend longitudinally beyond the armature stack, the armature assembly being concentrically mounted about a rotatable shaft for rotation therewith, said end plate comprising:

a disc having a centrally located aperture and a plurality of winding apertures, the centrally located aperture being adapted to receive the rotatable shaft and maintain concentricity between the end plate, the rotatable shaft and the armature stack, and the winding apertures being adapted to receive the conductive windings and being located so as to align with the winding slots when the disc is mounted on the shaft; and no more than one retaining flange integrally formed with the disc and being located radially outwardly of, and in a supporting relation to, the end turns.

11. An end plate as set forth in claim 10, wherein the end plate is formed of nonferromagnetic material.

12. An end plate as set forth in claim 10, including insulating means for electrically insulating the end plate from the armature stack and the conductive windings.

13. An end plate as set forth in claim 12, wherein the insulating means comprises a non-conductive insulating coating on the end plate.

14. An end plate as set forth in claim 13, wherein the end plate is formed of an epoxy-graphite composite.

15. An end plate as set forth in claim 14, wherein the end plate has substantially the same outer diameter as the armature stack.

16. A generator exciter for converting mechanical energy from a rotatable shaft into electrical energy, comprising:

a stator being adapted to produce a DC field;

a cylindrical armature stack mounted concentrically with the rotatable shaft for rotation relative to the stator and including conductive windings connected to generate electrical power in response to rotation through the DC field, the conductive windings including end turns which extend longitudinally beyond the armature stack;

first and second end plates disposed at opposing ends of the armature stack, each end plate including no more than one retaining flange and a centrally located aperture, the flange being located radially outwardly of, and in a supporting relation to, the end turns, and the aperture being adapted to receive the rotatable shaft and maintain concentricity between the end plates, the rotatable shaft, and the armature stack; and insulating means for electrically insulting the windings and armature stack from the end plates.

17. A generator exciter as set forth in claim 16, wherein the insulating means comprises a nonconductive insulating coating on the end plates.

18. A generator exciter as set forth in claim 17, wherein the end plates are formed of an epoxy-graphite composite.

19. A generator exciter as set forth in claim 18, wherein the end plate has substantially the same outer diameter as the armature stack.

20. A generator exciter as set forth in claim 19, including a connector means for fixedly securing the end plates to the armature stack.

21. A generator exciter as set forth in claim 20, wherein the connector means comprises the armature windings.

22. A generator exciter as set forth in claim 20, including a connector adapted to fixedly secure the end plates to the rotatable shaft.

\* \* \* \* \*